United States Patent [19]

McDaniel et al.

[11] Patent Number: 5,343,780

[45] Date of Patent: Sep. 6, 1994

[54] VARIABLE POWER DRIVETRAIN ENGINE CONTROL SYSTEM

[75] Inventors: John R. McDaniel; Paul R. Rabe; John H. Stang, all of Columbus, Ind.; Peter J. Griffen, Newton Aycliffe, United Kingdom; Mark W. Stasell, Fort Wayne, Ind.; Edward E. Londt, Fort Wayne, Ind.; Barrie L. Wilson, Fort Wayne, Ind.

[73] Assignee: Cummins Engine Company, Inc., Columbus, Ind.

[21] Appl. No.: 920,250

[22] Filed: Jul. 27, 1992

[51] Int. Cl.⁵ .............................................. F16H 59/18
[52] U.S. Cl. ...................................... 477/108; 180/179
[58] Field of Search ............................ 74/860; 180/179

[56] References Cited

U.S. PATENT DOCUMENTS

| | | | |
|---|---|---|---|
| 4,493,303 | 1/1985 | Thompson et al. | 123/357 |
| 4,750,598 | 6/1988 | Danno et al. | 192/0.058 |
| 4,914,597 | 4/1990 | Moncelle et al. | 364/426.04 |
| 5,019,986 | 5/1991 | Londt et al. | 364/426.04 |
| 5,121,324 | 6/1992 | Rini et al. | 364/431.05 |
| 5,224,045 | 6/1993 | Stasell | 364/431.07 |

FOREIGN PATENT DOCUMENTS

2380586 9/1978 France .

Primary Examiner—Dirk Wright
Attorney, Agent, or Firm—Woodard, Emhardt, Naughton, Moriarty & McNett

[57] ABSTRACT

A variable power drivetrain engine control system for a heavy duty vehicle such as a tractor/trailer combination or truck is disclosed. The engine control system provides higher output capability for the engine of the vehicle in accordance with certain detected conditions. If the vehicle speed falls a predetermined DELTA miles/hour below a LEARNED SPEED of the vehicle, the engine is enabled to operate at a higher power output capability until the vehicle resumes the LEARNED SPEED. Further, high output capability is enabled when the vehicle deceleration is in excess of a predetermined deceleration rate. Again, the high output capability is disabled once the vehicle retains the LEARNED SPEED velocity. The quantity DELTA can be variable with respect to actual vehicle speed to provide more responsive operation of the variable power drivetrain system thereby providing improved responsiveness to road conditions in accordance with relative vehicle speed.

20 Claims, 5 Drawing Sheets

VARIABLE POWER DRIVETRAIN ENGINE CONTROL SYSTEM

FIELD OF THE INVENTION

This invention relates in general to vehicles powered by an internal combustion engine and more specifically to vehicles including electronic engine control systems having microprocessor-based engine controllers.

BACKGROUND OF THE INVENTION

Microprocessor-based engine controllers are well-known in the art of internal combustion engines. Such devices are used not only to improve performance but to reduce emissions and accurately control engine operations. The advent of microprocessor or computer control of engine operation has opened the door to a panoply of feedback control systems implementing a wide variety of engine control objectives. Examples of such systems are electronically timed ignition systems, digitally controlled fuel injection systems and emission control systems including mass air flow transducers, temperature sensors, pressure sensors and other feedback devices useful in determining emission or pollutant levels in the exhaust system of a vehicle.

In recent years, electronic engine control systems have found applications in the heavy duty engine market, more particularly the diesel engine market. One example of such a system is the CELECT engine control system manufactured by Cummins Engine of Columbus, Ind., and available with their N-14 engine, as well as other engine models. The CELECT electronic engine control system was first introduced in 1990 and has been well received by the heavy duty trucking industry. One of the advantages of a fully electronic engine control system is the ability to modify the software or program to implement newly devised engine control algorithms in response to a recognition of the need for the algorithm. The present invention contemplates an engine control system that implements an algorithm enabling a derated lower power output engine to operate at a higher power output level under certain prescribed conditions or circumstances.

Engine control systems that enable engine operation at more than one maximum power output capability based upon certain operating conditions are known. Examples of such systems are disclosed in U.S. Pat. No. 5,019,986 to Londt et al, U.S. Pat. No. 4,914,597 to Moncelle et al. and U.S. Pat. No. 4,493,303 to Thompson et al. Each of these system limits fuel flow rates, via fuel injection systems, depending upon certain sensed parameters. The Moncelle et al. patent suggests that variable power limits can be established to operate an engine under cruise control conditions to provide more desirable operating characteristics. Unfortunately, large tracts of public roads include road grade deviations sufficient to discourage the use of cruise control with heavy duty trucks in view of the "lug up" and "lug down" characteristics of operating a heavy duty truck. For example, when a heavy duty truck or tractor/trailer combination is operating at 60,000 to 80,000 pounds gross weight, even a small hill or incline will induce a distracting velocity decrease of the truck even though the engine of the truck is operating at full power output. Thus the efficacy of a cruise control system is significantly affected when a heavy duty truck encounters hills or inclines while operating in "cruise" mode.

An engine control system that is more responsive to road grade deviations and enables the truck to maintain a constant speed yet limits power output in such a fashion as to prevent excessive power under lower road load demand conditions will increase driveability of the vehicle as well as reduce certain hardware requirements for the vehicle and reduce Brake Specific Fuel Consumption (lbs/hp-hr) resulting in improved fuel economy. Increased power capability under certain operating conditions also enables the driver to avoid downshifts which can degrade fuel economy. Such an engine control system is needed to improve run times or delivery time, maintain vehicle mileage rates at an acceptable value yet satisfy the driver in terms of vehicle performance characteristics.

SUMMARY OF THE INVENTION

A method is provided, according to one aspect of the present invention, for operating a vehicle having an internal combustion engine coupled to a transmission and in which the engine includes a fuel delivery system for delivering fuel to the engine according to a first fuel delivery curve or a second fuel delivery curve, and in which fuel delivery to the engine according to the second fuel delivery curve results in higher power output from the engine compared with fuel delivery according to the first curve. The method comprises the steps of: (1) sensing throttle demand from the driver, (2) supplying fuel to the engine according to the first fuel delivery curve, (3) sensing a throttle demand from the driver in excess of a predetermined throttle level, (4) sensing instantaneous vehicle speed, (5) determining an average vehicle speed from instantaneous vehicle speed sensed over a recent predetermined time period, (6) sensing instantaneous vehicle deceleration, and (7) enabling the fuel delivery system to deliver fuel according to the second fuel delivery curve only if (a) the sensed throttle demand is in excess of a predetermined throttle demand value, and (b) ((the instantaneous vehicle speed has decreased a predetermined DELTA mph from the average vehicle speed) —OR— (the vehicle deceleration is in excess of a predetermined deceleration value)).

A heavy duty vehicle, according to another aspect of the present invention, includes an engine, a fuel delivery system, a transmission, a throttle control and an engine control means for operatively controlling the fuel delivery system to supply fuel to the engine, wherein the engine control system comprises a memory means, a first fuel delivery curve stored in the memory means, a second fuel delivery curve stored in the memory means, means for sensing vehicle speed and producing a vehicle speed signal, means for calculating a running average vehicle speed from the vehicle speed signal, the means for calculating producing a running average vehicle speed signal, means for sensing engine speed and producing an engine speed signal, means for sensing throttle demand from the throttle control and producing a corresponding throttle signal, means for determining vehicle deceleration from the vehicle speed signal and producing a deceleration signal corresponding thereto, and means for controlling the fuel delivery system to deliver fuel to the engine according to the first fuel delivery curve in accordance with the throttle signal. The means for controlling the fuel delivery system enables fuel delivery by the fuel delivery system to the engine according to the second fuel delivery curve in response to the following conditions:

(1) the vehicle speed signal is less than the running average vehicle speed signal minus a predetermined value DELTA, or
(2) the vehicle deceleration signal is above a predetermined deceleration limit, and
(3) the throttle signal is in excess of a predetermined throttle level.

One object of the present invention is to provide an improved device and method of operating an engine in a vehicle.

Another object of the present invention is to provide improved driveability to satisfy the driver of a vehicle, as well as maintain vehicle fuel mileage at or above a desired level.

Yet another object of the present invention is to provide an engine control system that enables higher power output in response to operating conditions which call for increased power output.

Still another advantage of the present invention is to reduce cooling capacity demand on a vehicle's cooling system and reduce torque handling specifications for a vehicle transmission, which may eliminate the requirement for a transmission cooler, as a result of the limited power and torque capability of the vehicle engine at lower vehicle speeds.

A further object of the present invention is to provide a device and method for operating an engine of a motor vehicle to maintain the speed of the vehicle and diminish speed deviations even through vehicle speed may not be controlled by a cruise control feedback system.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
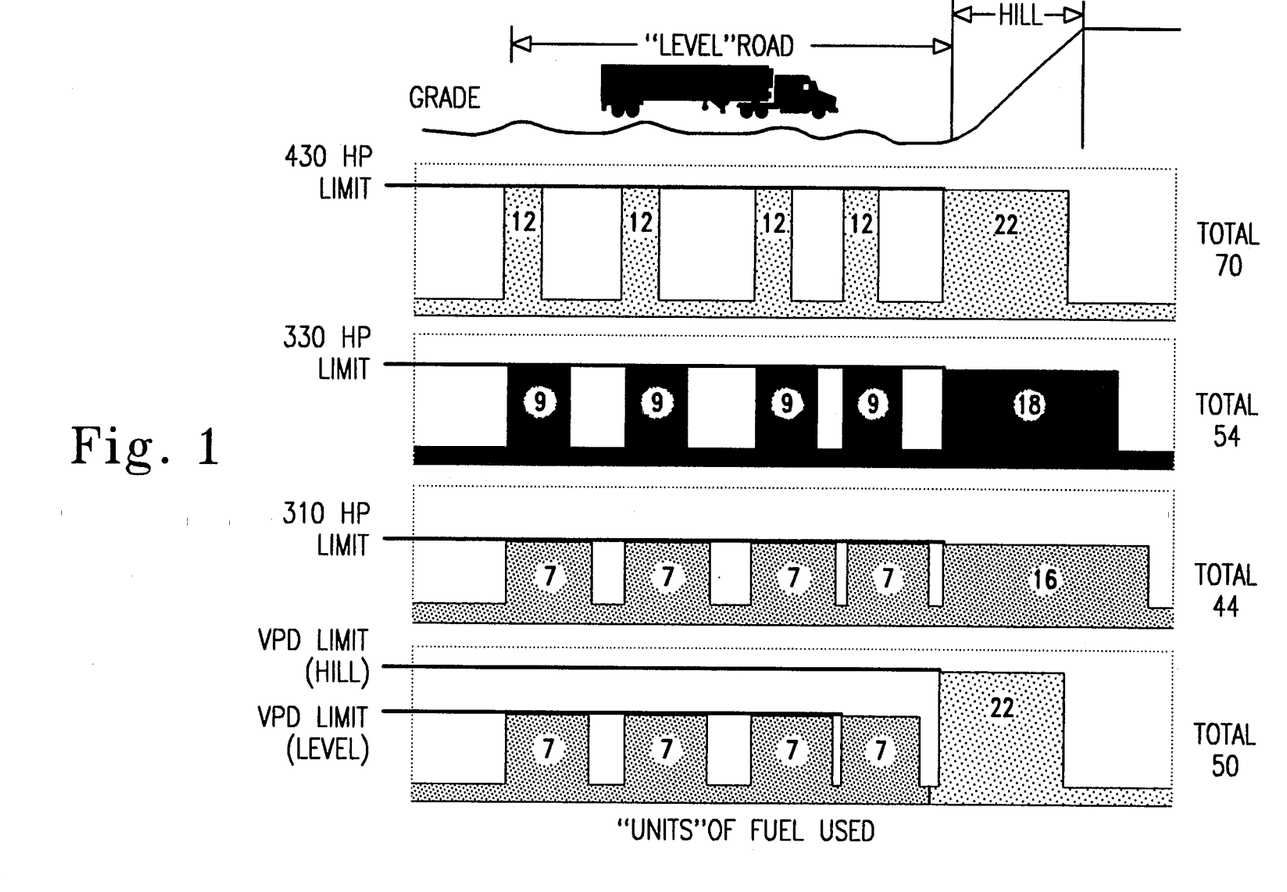
FIG. 1 is a comparison chart depicting hypothetical total fuel units used for various engine horsepower capabilities versus a variable power drivetrain engine control system including the engine control algorithm of the preferred embodiment.

Referring now to FIG. 1, a chart depicting fuel consumption in "units" of fuel used is shown for a 430 horsepower engine, a 330 horsepower engine, a 310 horsepower engine, and a vehicle equipped with a variable power drivetrain engine control system according to the present invention having a 310 horsepower lower limit and a maximum power capability of 430 horsepower. A study of a number of vehicle configurations running a variety of missions using different horsepower capability according to those shown in FIG. 1 suggests that a vehicle is normally run between 40 and 50% of its time at full available horsepower, virtually independent of rated horsepower capability of the vehicle. The full-throttle time is composed of obvious "lug up/lug down" time plus a significant portion of "level" road time. The reasons that a significant portion of "level" road operating time is spent at full available horsepower is that even when roads appear level, they actually are not. That is, even level roadways result in an engine power demand which is constantly increasing and decreasing. These power demand changes result from the constant presence of slight grades, overpasses, and changing traffic conditions. The relative engine power output results are reflected in the fuel consumption units of the graphs shown in FIG. 1. With full available torque demanded 40-50 percent of the time, it is apparent that there is no difference between a full-time high horsepower engine and one which supplies higher output only when road conditions demand "burst power". In fact, a variable power drivetrain or driveline vehicle uses less fuel than a high power vehicle as shown in FIG. 1 wherein a 430 horsepower engine requires 70 units of fuel versus 50 units of fuel required by the variable power drivetrain vehicle.

Figure 2:
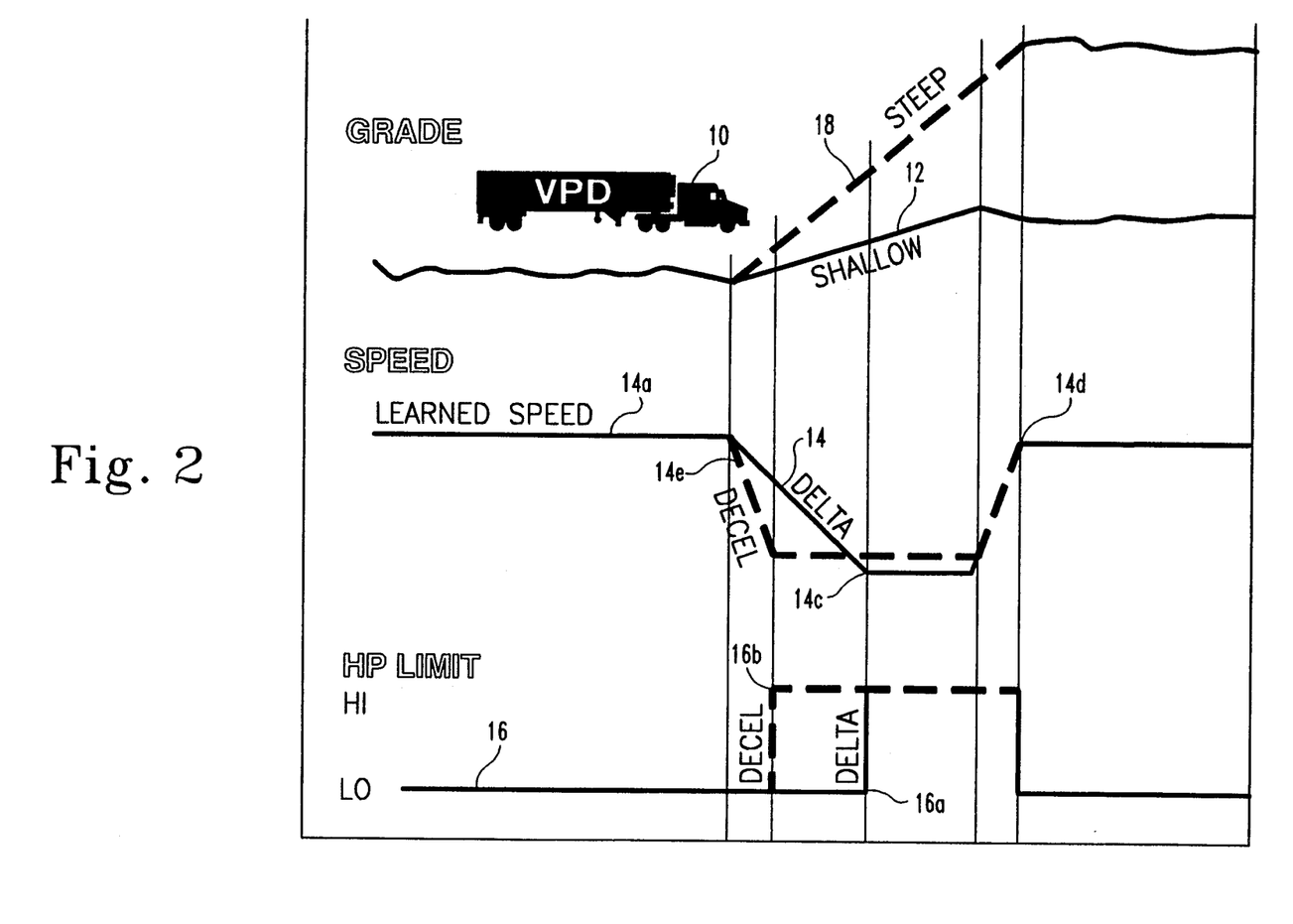
FIG. 2 is a chart depicting the effect of road grade on vehicle speed and resulting horsepower capability of the variable power drivetrain engine equipped vehicle according to the present invention.

Referring now to FIG. 2, the mechanisms for enabling the high output or "burst power" condition are diagrammatically shown. As the tractor-trailer with a variable power drivetrain engine control system (or VPD) 10 of the present invention approaches the shallow grade 12, the speed of the vehicle decreases as shown by the slope of the velocity curve at 14. Prior to encountering the shallow grade 12, the vehicle 10 operated at a speed represented by the fiat portion of the velocity at 14a. During that time period, the engine control system of vehicle 10 calculated a "LEARNED SPEED" corresponding to the average speed of the truck over a most recent predetermined period of time. As the truck slows to a lesser speed at location 14c in the velocity curve, the horsepower output capability of the engine in VPD vehicle 10 is increased from a low power output to a high level at 16a until the speed of the vehicle returns to the LEARNED SPEED at 14d. Thus, one mechanism for enabling the high power output capability of the VPD truck 10 is a decrease in speed from a "LEARNED SPEED" derived from a recent average vehicle speed.

A second mechanism for enabling high power output from the engine of the VPD vehicle 10 is based upon the vehicle experiencing a deceleration rate in excess of a predetermined deceleration rate. This condition occurs most often when a steep grade such as that represented by the road grade curve at 18 is encountered by VPD vehicle 10, resulting in vehicle deceleration determined by the slope in the velocity curve at 14e. The high power output of the engine in VPD vehicle 10 is enabled at location 16b in the limit curve 16 when the deceleration rate is first determined to be in excess of a predetermined level. By comparison, it is noted that high power output capability of the engine of VPD truck 10 is enabled earlier (as compared with location 16a and a lesser deceleration rate) when a rapid deceleration rate is encountered thereby providing increased power to ascend the steeper grade before a significant amount of vehicle velocity is lost due to the steep grade 18.

One objective of the invention is to provide increased power output capability in response to a loss of vehicle speed or a significant deceleration rate of the vehicle. The difference in the LEARNED SPEED at 14a and the speed at 14c will be referred to as DELTA, which term represents the difference in speed between the LEARNED SPEED and the lower velocity at which the high output capability of the engine of the vehicle VPD 10 is enabled. DELTA can be a variable quantity based upon the relative value of the LEARNED SPEED value. For example, the following Table 1 represents a possible variation in DELTA versus LEARNED SPEED values. Linear as well as non-linear relationships between a variable DELTA and LEARNED SPEED are contemplated.

TABLE 1

| LEARNED SPEED | DELTA |
|---|---|
| 50 | 5 |
| 55 | 6 |
| 60 | 7 |
| 65 | 8 |

Figure 3:
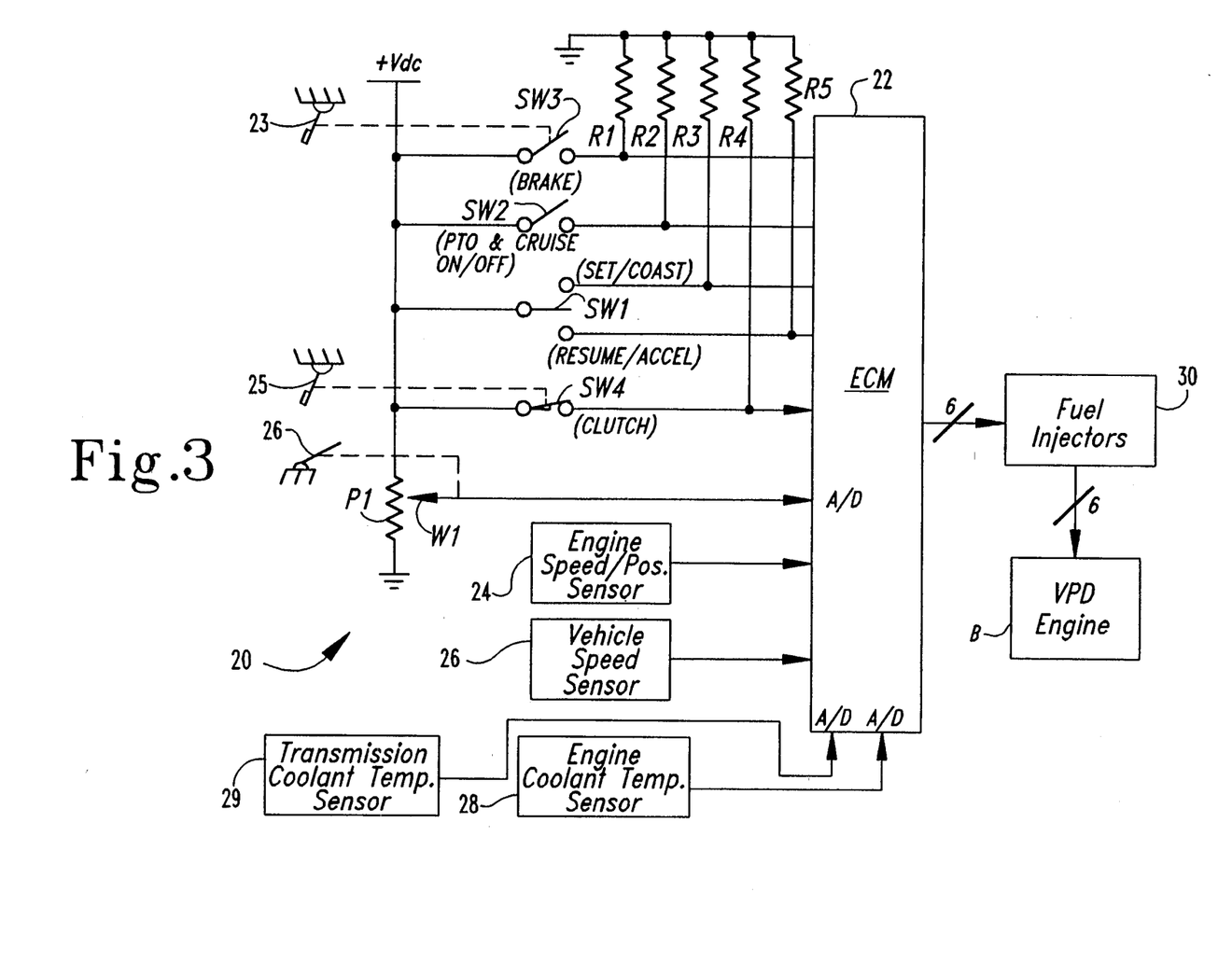
FIG. 3 is a simplified schematic of the variable power drivetrain engine control system according to the present invention.

Referring now to FIG. 3, a simplified schematic of a VPD engine control system 20 according to the present invention is shown depicting the input signal sources and the fuel injectors 30 subject to the output control of the system. One input signal affecting the operation of the VPD engine equipped vehicle is the condition of the brakes. If brake pedal 23 is energized, switch SW3 is closed and a signal is supplied to an input of ECM 22 indicating the vehicle brakes are being applied. Vehicle acceleration or power output requests from the driver are commanded through the accelerator pedal 26 which is mechanically coupled to potentiometer P1. A voltage representative of the power output requested from the driver appears at wiper W1 and is supplied to engine control module 22. ECM 22 includes an analog to digital converter to convert the voltage at wiper W1 into a meaningful digital value. In response to the voltage appearing at wiper W1, ECM 22 provides signals to fuel injectors 30 in accordance therewith to power the engine at a power output level corresponding with the position of accelerator pedal 26 and the "Hi" or "Low" power output state of the VPD engine. Engine speed is determined by monitoring the signals produced by engine speed/position sensor 24, which signals are supplied to ECM 22. Engine speed/position sensor 24 is a variable reluctance sensor (well-known in the art) disposed in close proximity to a tone wheel or gear (not shown). The sensor 24 produces pulses in accordance with the rotational speed of the tone wheel. The tone wheel (not shown) rotates in synchronism with the engine of VPD vehicle 10. Vehicle speed sensor 26 operates in similar fashion as sensor 24. However, vehicle speed sensor 26 detects the speed of rotation of a tone wheel attached to the tailshaft or driveshaft of the vehicle. Of course, the tailshaft rotates in synchronism with the rotational speed of the tires of the vehicle. Thus, vehicle speed is calculated in accordance with a count of the pulses per unit time produced by the sensor 26. Accordingly, a final drive ratio of the transmission is calculated by dividing the vehicle speed value into the engine speed value, (ENGINE SPEED/VEHICLE SPEED) Engine coolant temperature sensor 28 provides an analog signal to an analog to digital or A/D input of ECM 22 corresponding to the coolant temperature of the vehicle engine. Similarly, transmission coolant temperature sensor 29 produces an analog transmission fluid/coolant temperature signal that is supplied to an A/D input of ECM 22. Switches SW1 and SW2 are cruise control and power-take-off control switches. Switch SW2 activates cruise control capability and switch SW1 is a double action switch providing a set/coast signal to ECM 22 in a first position and a resume/accelerate signal to ECM 22 when toggled into a second position. Clutch pedal 25 is mechanically coupled to and actuates switch SW4 thereby providing ECM 22 with a clutch actuation signal. Resistors R1, R2, R3, R4 and R5 provide pull down functions to maintain the inputs of ECM 22 at a predetermined logic state.

Figure 4:
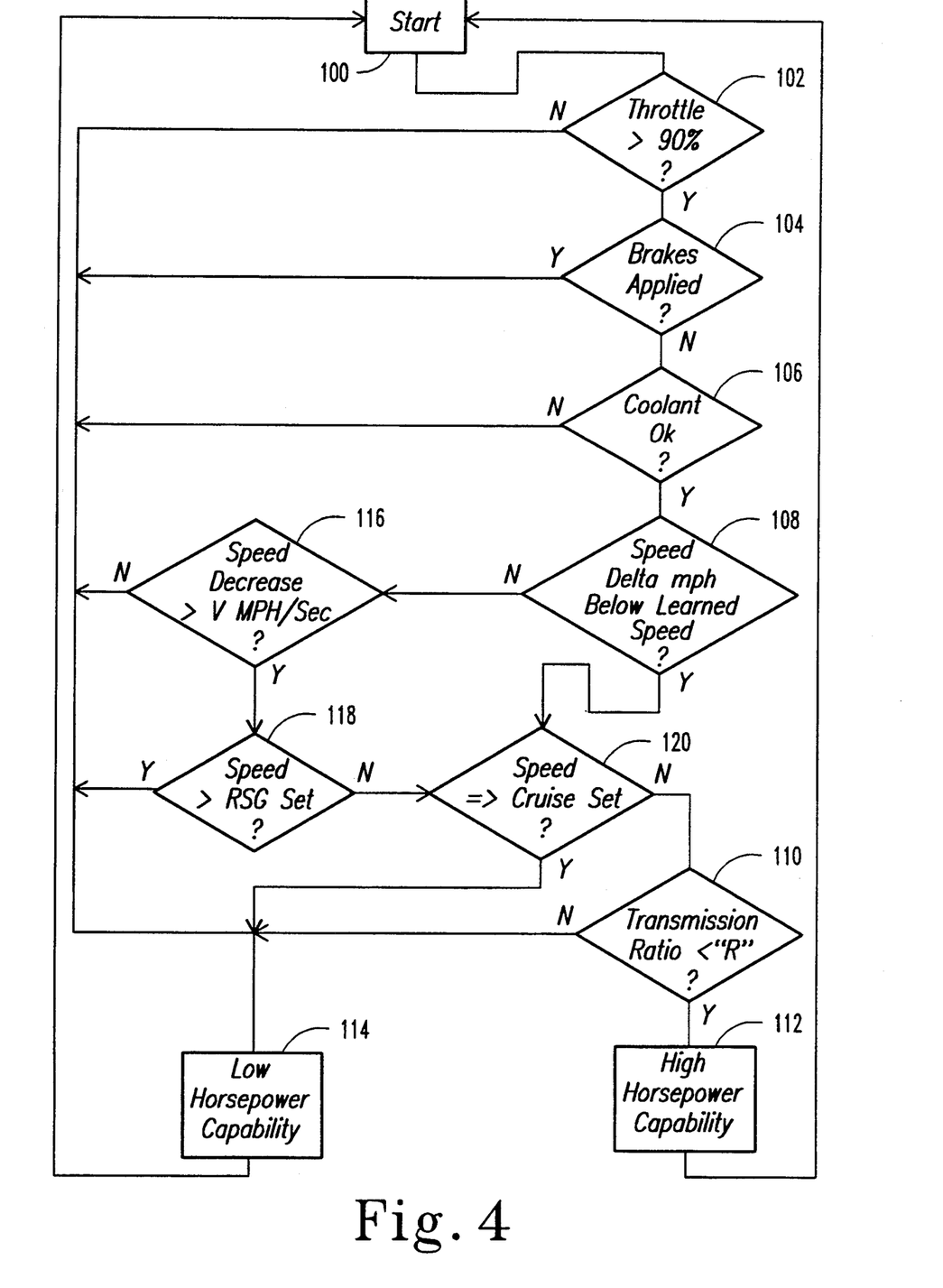
FIG. 4 is a flow chart of the algorithm executed by the variable power drivetrain engine control system according to the present invention.

Operationally speaking, the VPD engine control system 20 according to the present invention monitors input signals from brake pedal 23 through switch SW3, throttle position through potentiometer P1 and the voltage appearing on potentiometer W1, engine speed through sensor 24, vehicle speed through sensor 26 and vehicle coolant temperature through sensor 28 to execute or perform the algorithm shown in FIG. 4.

Referring now to FIG. 4, the algorithm begins at step 100 and runs or executes a predetermined number of times per second in order to continuously monitor the operating conditions of the VPD vehicle 10 and provide a higher output power capability when operating conditions command or demand such. At step 102, throttle position, determined by ECM 22 from the voltage at wiper W1, is tested against a 90 percent predetermined throttle value stored in memory of ECM 22. Other predetermined percent throttle values are also contemplated. The 90 percent value is merely illustrative of one embodiment of the algorithm according to the present invention. If the throttle request (wiper voltage) is greater than 90 percent throttle, program execution continues at step 104. Otherwise, program flow continues at step 114 and the VPD engine is operated at a low horsepower or low power output level. If the throttle request is determined to be greater than 90 percent at step 102, then program flow continues at step 104 wherein ECM 22 tests to determine whether the brakes have been applied by the driver. Switch SW3 provides a signal to ECM 22 indicative of the state of the brakes and if the brakes are not applied, then program execution continues at step 106. If at step 104 it is determined that the brakes have been applied then program execution continues at step 114. If the brakes are not applied at step 104, then program execution continues at step 106 where ECM 22 inputs the signal from temperature sensor 28 to determine whether or not the coolant temperature of the engine is below a predetermined limit. It is important to recognize that high power output capability of the engine should not be enabled if the coolant temperature of the engine (or optionally coolant temperature of the transmission if a transmission fluid/coolant temperature sensor signal is monitored) indicates that the engine (or transmission) coolant temperature is above a predetermined value. If the coolant temperature is within safe operating limits then program execution continues at step 108. If the temperature of the engine coolant is in excess of a predetermined limit, then program execution continues at step 114 following step 106. At step 108, ECM 22 determines whether the current vehicle speed, determined through signals from sensor 26, is greater than "DELTA" miles/hour below the LEARNED SPEED. If the vehicle speed is a DELTA or predetermined amount below the LEARNED SPEED, then program execution continues at step 120 following step 108. Alternatively, if the vehicle speed is not a predetermined DELTA below the LEARNED SPEED, then program execution continues at step 116. At step 116, the deceleration rate or the speed decrease per unit time is tested to determine if it is greater than a predetermined amount or value "V" miles/hour/second deceleration. If vehicle 10 deceleration (measured through engine deceleration) is in excess of "V" (typical values found useful are 10-15 RPM/Sec., yet values outside this range are contemplated), then program execution continues at step 118, otherwise program execution continues at step 114 if the deceleration rate is not in excess of a predetermined quantity. At step 118, ECM 22 determines whether the vehicle speed is greater than the road speed governor value preprogrammed into the memory of ECM 22 to prevent excessive speed of the vehicle 10.

If at step 118 vehicle speed is not greater than the road speed governor RSG programmable speed limit then program execution continues at step 120. If vehicle speed is greater than the RSG value in ECM memory, then program execution continues at step 114 following step 118. At step 120, ECM 22 determines whether vehicle speed is greater than or equal to the cruise "set" speed programmed into ECM 22 by the driver via switch SW1. If the vehicle is traveling in excess of the cruise set speed, maximum limit value then program execution continues at 114 after step 120. Otherwise, following step 120, if the vehicle speed is not equal to or greater than the cruise set speed, then ECM 22 determines whether or not a predetermined transmission ratio "R" is greater than the actual transmission final drive ratio of the vehicle by comparing the engine speed fi-om sensor 24 with the vehicle speed 26 at step 110. If the actual transmission ratio is less than the value R, then the high horsepower output capability of the engine is enabled at step 112. It is contemplated that the value R is selected so that high horsepower output is available when the top two (or three) gears of the transmission are engaged, thereby enabling a downshift by the driver at highway speeds without loss of high power capability. Following either step 112 or step 114, program execution returns to step 100 wherein the algorithm is executed continuously while the vehicle is traveling down the road and the engine is operating.

Modifications to the algorithm of FIG. 4 are contemplated to eliminate undesirable operation of the engine under certain foreseeable conditions. One such condition occurs when the driver momentarily releases the accelerator pedal thereby reducing throttle demand below the 90% level. This may occur when the vehicle encounters a chuck hole or bump in the road and the driver is physically cast about within the vehicle, or when the driver momentarily releases the accelerator in view of upcoming traffic conditions. It is desired that high output power capability remain available for a limited time period following release of the accelerator pedal and upon returning to throttle demand in excess of 90 percent during such a momentary release of the accelerator pedal. Therefore, a software timeout that requires throttle demand be below 90% for a predetermined time period before hi power output capability is disabled is contemplated to avoid such undesirable operation.

Operation of the algorithm of FIG. 4 is continuous, including during typical cruise control operation of the vehicle. It is desirable that momentary depressions of the clutch or brake pedal not interfere with high power engine output capability during cruise control operation. Programmed software delay timers or software timeout tests are contemplated as additions to cruise control software algorithms to prevent loss of high power output capability (or to prevent return to low power output operation mode) in response to momentary depressions of the clutch or brake pedal in view of traffic conditions requiring such a driver response.

Figure 5:
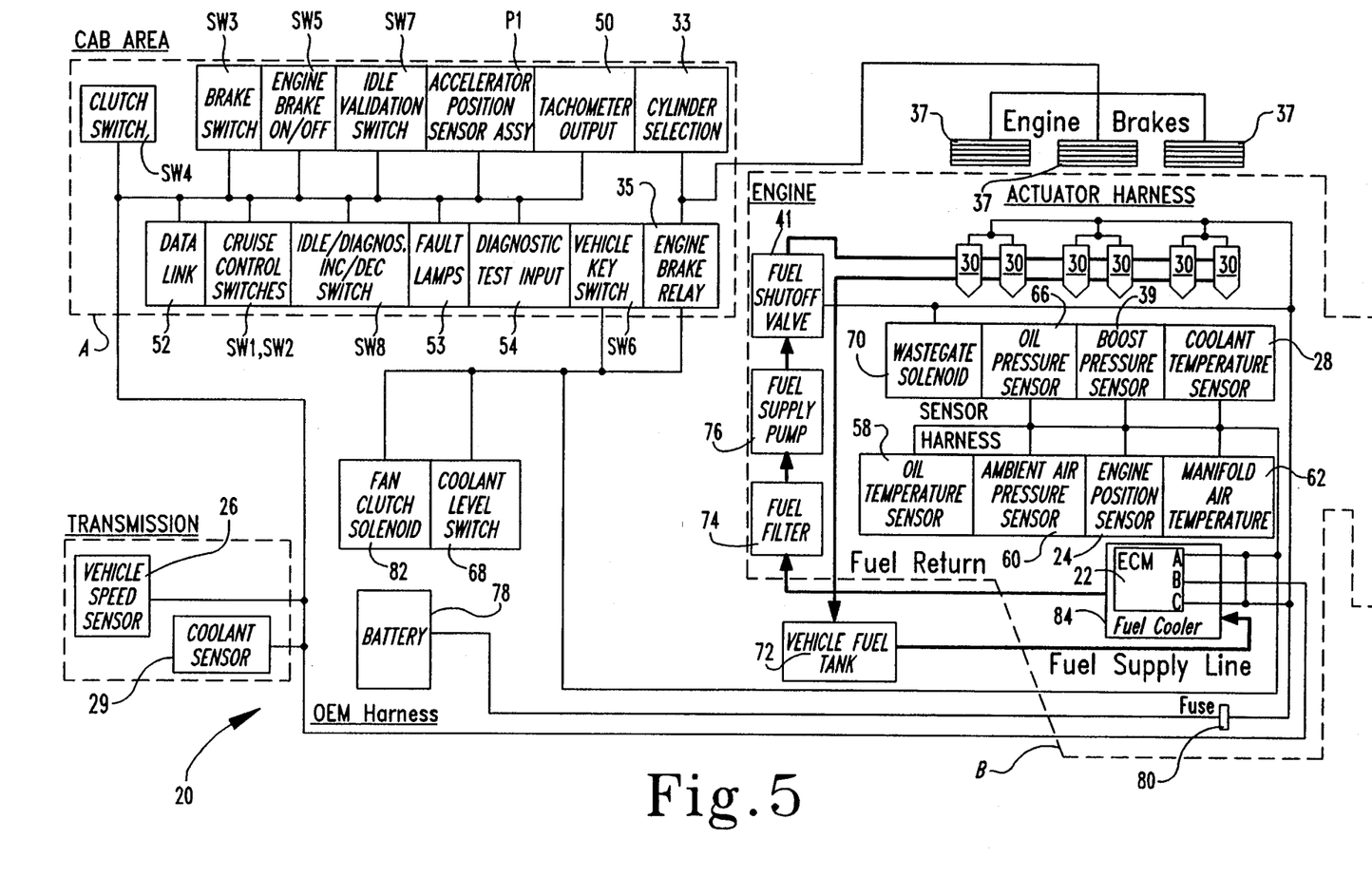
FIG. 5 is a detailed diagrammatic illustration of the CELECT engine control system according to the present invention detailing input and output devices coupled to the engine control module.

Referring now to FIG. 5, a more detailed block diagram of the variable power drivetrain engine control system 20 according to the present invention is shown. Like components of FIG. 3 are identified with like designations in FIG. 5. System componentry located in the cab area A includes clutch switch SW4, brake switch SW3, engine brake on/off switch SW5 and cruise control switches SW1 and SW2. Accelerator position sensor assembly P1 corresponds with potentiometer P1 of FIG. 3. Vehicle key switch SW6 is also shown. Cylinder selection device 33 and engine brake relay 35 are located in the cab area A while cylinder control devices 37 are attached to the engine (indicated by broken line B). Cylinder control devices 37 operate in conjunction with the cylinder selection switch 33 and engine brake relay 35 to provide engine compression braking for the heavy duty engine B. Other components of the CELECT system include an idle validation switch SW7 and an idle/diagnostics INC/DEC switch SWS. A tachometer output 50 is provided in the cab area as well as a data link 52 that enables electrical connections to an external diagnostics device. Fault lamps 53 provide an indication to the driver of various engine operating or fault conditions detected by ECM 22. A diagnostic test input 54 is also provided in the cab area for entering input information with regard to diagnostics.

Systems closely associated with and attached to the engine of the vehicle are contained within the broken line B representing the vehicle engine. Sensors that provide operating condition information to ECM 22 include boost pressure sensor 39, engine speed/position sensor 24, vehicle speed sensor 26, engine coolant temperature sensor 28, transmission coolant temperature sensor 29, oil temperature sensor 58, ambient air pressure sensor 60, manifold air temperature sensor 62, coolant temperature sensor 64, oil pressure sensor 66, and coolant level switch 68.

Devices that are subject to control by ECM 22 include wastegate solenoid 70, fuel shut-off valve 41, and fuel injectors 30. Also shown are a vehicle fuel tank 72, a fuel filter 74, a fuel supply pump 76, a battery 78, a fuse 80, and fan clutch solenoid 82 controlled by ECM 22. Lastly, ECM 22 is located within fuel cooler 84 to provide a temperature controlled environment for ECM 22.

The system depicted in FIG. 5 corresponds with the electronic engine control system manufactured by Cummins Electronics of Columbus, Ind. and is included with certain engines sold by Cummins Engine of Columbus, Ind. One such engine is model number N14. Other engines are also equipped with CELECT engine controllers. The engine control system 20 is sold and marketed under the trademark CELECT by Cummins Electronics.

Cummins electronic engine control systems control multiple fuel injectors each having a metering valve (not shown) controlled by a meter valve signal produced by the engine control system. This approach is well known to those skilled in the art of fuel injection systems. The meter valve signal is produced in accordance with throttle position according to a fueling curve stored in memory in the form of a table of values. The duration of each meter valve signal determines the quantity of fuel to be delivered by the injector. Relative timing of the production of the meter valve signal is used in controlling injector timing through a collapsible hydraulic coupling between the mechanical injector and a cam actuator (not shown). Time Valve Open (TVO) is a term used to describe the duration of the meter valve signal produced in accordance with stored data in the control system memory. An alternate set of TVO data (corresponding to a high power output curve) is used when the conditions of the algorithm are satisfied to enable fuel delivery at a higher rate resulting in increased power output through increased quantities of fuel injected into the combustion chamber of the engine.

In another embodiment of the present invention, a geographic position identification device supplies a signal to ECM 22. The ECM responds by selecting a fuel delivery curve from memory to provide high output power capability in accordance with the local road grades where the vehicle is located. For example, high output power capability for road grades in the state of Kansas (known throughout the United States as one of the flattest States in the Union) should be lower than high power output capability in the State of Colorado (a mountainous state). It is also contemplated that the low power fuel delivery curve may be altered or a new curve substituted in a state such as Colorado wherein steep grades prevent rapid acceleration up mountainous slopes and low vehicle speed power levels should be higher to accommodate such conditions. Substituting different low and high power fuel curves based upon geographic location of the vehicle dramatically improves the drivability of the vehicle. Alternatively, fuel consumption is more accurately controlled by lowering engine horsepower in the high output capability mode where road grades are substantially fiat and the need for maximum power output capability of the engine is not present. Five to ten fuel curves are contemplated as a reasonable quantity (particularly in view of memory requirements for such curves) to correspond with road grade conditions encountered in the United States Alternatively, a fueling algorithm is contemplated that calculates amounts of injected fuel (or TVO values) in accordance with operating conditions and wherein a coefficient multiplier (selected in accordance with geographic road grade conditions) determines maximum engine power output in low or high power capability mode of operation. The Global Positioning System (GPS) signal provides a very accurate position signal anywhere in the world via a satellite triangulation system. Many GPS devices are available in the market to provide location information accurate to within a few meters. Loran systems used in the aviation industry are also contemplated as suitable geographic location identification devices. Finally, a cellular phone communication system is suitable as a source of geographic information if the cell is identified through an ID number and the ECM is programmed to select particular fuel curves in accordance with cellular communication cell ID numbers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of operating a vehicle having an internal combustion engine coupled to a transmission and wherein the engine includes a fuel delivery system responsive to a throttle control for delivering fuel to the engine according to a first fuel delivery curve or a second fuel delivery curve, and wherein fuel delivery to the engine according to the second fuel delivery curve results in higher power output from the engine compared with fuel delivery according to the first curve, the method comprising the steps of:
    (1) sensing throttle demand;
    (2) supplying fuel to the engine according to the first fuel delivery curve;
    (3) sensing a throttle demand from the driver in excess of a predetermined throttle level;
    (4) sensing instantaneous vehicle speed;
    (5) determining an average vehicle speed from instantaneous vehicle speed sensed over a recent predetermined time period;
    (6) determining vehicle deceleration from sensed vehicle speed; and
    (7) enabling said fuel delivery system to deliver fuel according to said second fuel delivery curve only if:
        (a) the sensed throttle demand is in excess of a predetermined throttle demand value, —AND—
        (b) ((the instantaneous vehicle speed has decreased a predetermined DELTA mph from said average vehicle speed) —OR— (the vehicle deceleration is in excess of a predetermined deceleration value)).

2. The method of claim 1 including the step of sensing engine coolant temperature and wherein said enabling step includes the conditional that:
    (d) —AND— said engine coolant temperature is within an acceptable range.

3. The method of claim 2 including the step of sensing the transmission input/output ratio and wherein said enabling step includes the conditional that:
    (e) —AND— said sensed transmission input/output ratio be within a predetermined ratio range.

4. The method of claim 3 wherein said predetermined DELTA mph value increases in magnitude in accordance with an increase in said average vehicle speed.

5. The method of claim 1 wherein said predetermined DELTA mph value increases in magnitude in accordance with an increase in said average vehicle speed.

6. The method of claim 4 including the steps of sensing engine coolant temperature and sensing the transmission input/output ratio and wherein said enabling step includes the conditional that:
    (d) —AND— said sensed transmission input/output ratio is within a predetermined ratio range,
    (e) —AND— said sensed engine coolant temperature is within an acceptable range, (f) —AND— the brakes are not actuated by the driver.

7. The method of claim 6 wherein said throttle demand must be below said predetermined throttle demand value for a predetermined period of time before fuel delivery according to said first fuel delivery curve resumes.

8. The method of claim 7 wherein said enabling step includes the conditional that includes the additional tests:

(g) —AND— the vehicle speed is less than a road speed governor speed limit, and (h) —AND— the vehicle speed is less than a cruise set speed maximum limit value, (i) —AND— the vehicle speed is less than a driver commanded cruise set speed.

9. A vehicle having an engine, a fuel delivery system, a transmission, a throttle control and an engine control means for operatively controlling the fuel delivery system to supply fuel to the engine, said control means including:

a memory means;

a first fuel delivery curve stored in said memory means;

a second fuel delivery curve stored in said memory means;

means for sensing vehicle speed and producing a vehicle speed signal;

means for calculating a running average vehicle speed value from said vehicle speed signal and producing a corresponding running average vehicle speed signal;

means for sensing engine speed and producing an engine speed signal;

means for sensing throttle demand from said throttle control and producing a corresponding throttle signal;

means for determining vehicle deceleration from said vehicle speed signal and producing a deceleration signal corresponding thereto; and means for controlling said fuel delivery system to deliver fuel to said engine according to said first fuel delivery curve in accordance with said throttle signal, said means for controlling said fuel delivery system enabling fuel delivery by said fuel delivery system to said engine according to said second fuel delivery curve in response to the following conditions:

(1) said vehicle speed signal is less than said running average vehicle speed signal minus a predetermined value DELTA, or (2) said vehicle deceleration signal is above a predetermined deceleration limit, and (3) said throttle signal is in excess of a predetermined throttle level.

10. The device of claim 9 including means for sensing engine coolant temperature and producing a coolant temperature signal; and wherein said engine control means enables said fuel delivery system to deliver fuel to said engine in accordance with said second fuel delivery curve only when:

(1) said coolant temperature signal is within a predetermined temperature range, and (2) a transmission ratio, determined from said vehicle speed signal and said engine speed signal, is within a predetermined ratio range.

11. The device of claim 10 wherein said value DELTA varies in accordance with said running average vehicle speed.

12. The device of claim 11 wherein said means for controlling continues to enable fuel delivery according to said second fuel delivery curve even though said throttle signal falls below said predetermined throttle level if said throttle signal again exceeds said predetermined throttle level within a predetermined time delay.

13. The device of claim 12 wherein said means for controlling additionally tests to determine whether said vehicle speed signal is in excess of a road speed governor limit before enabling fuel delivery by said fuel delivery system according to said second fuel delivery curve.

14. The device of claim 13 wherein said means for controlling additionally tests to determine whether the vehicle speed signal is in excess of a cruise set speed maximum limit value before enabling fuel delivery by said fuel delivery system according to said second fuel delivery curve.

15. An engine control system for use with a vehicle having an internal combustion engine coupled to a transmission, said control system comprising:

fuel delivery means for delivering fuel to said engine in response to a signal supplied to said fuel input;

engine speed sensing means for producing an engine speed signal corresponding to engine speed;

vehicle speed sensing means for producing a vehicle speed signal corresponding to vehicle speed;

throttle demand sensing means for producing a throttle signal corresponding to a throttle request from the operator of the vehicle;

first circuit means responsive to said vehicle speed signal for producing an average speed signal corresponding to average vehicle speed over a recently expired interval of time;

second circuit means responsive to said engine speed signal for producing a deceleration signal corresponding to instantaneous engine deceleration;

third circuit means responsive to said throttle signal, said vehicle speed signal, said average speed signal and said deceleration signal to supply a low power output fueling signal to said fuel input in accordance with said throttle signal in a first mode of operation, and in a second mode of operation, to supply a high power output fueling signal to said fuel input, wherein said third circuit means operates in said second mode of operation if:

(a) said throttle signal is in excess of a predetermined throttle level —AND—

(b) ((said vehicle speed signal is more than a predetermined DELTA value below said average vehicle speed signal) —OR— (said deceleration signal is greater than a predetermined deceleration limit)).

16. The device of claim 15 wherein said vehicle includes a braking system and a cruise control system and including:

means for sensing engine coolant temperature and producing a coolant temperature signal corresponding thereto; and wherein said third circuit means operates in said second mode of operation only when the following additional conditions exist:

—AND— said vehicle speed signal is less than a predetermined road speed governor limit, —AND— said vehicle speed is less than a predetermined cruise set speed maximum value limit, —AND— said vehicle speed signal is less than a driver selected cruise set limit, —AND— the brakes of said vehicle are not actuated —AND— said temperature signal is below a predetermined temperature limit.

17. The device of claim 16 wherein said fuel delivery means are fuel injectors, and said first circuit means, said second circuit means and said third circuit means are part of a microprocessor based computer control system including RAM, ROM, analog and digital I/O.

18. The device of claim 17 wherein said DELTA value varies in magnitude in accordance with the magnitude of said vehicle speed signal.

19. The device of claim 18 wherein said throttle signal must be less than said predetermined throttle level for a predetermined minimum time period before said third circuit returns to operation in said first mode of operation.

20. The device of claim 15 wherein said DELTA value varies in magnitude in accordance with the magnitude of said vehicle speed signal.

* * * * *

UNITED STATES PATENT AND TRADEMARK OFFICE
CERTIFICATE OF CORRECTION

PATENT NO.  : 5,343,780
DATED       : September 6, 1994
INVENTOR(S) : John R. McDaniel et al.

It is certified that error appears in the above-identified patent and that said Letters Patent is hereby corrected as shown below:

In column 4, line 43, please change "fiat" to --flat--.

In column 7, line 42, please change "fi-om" to --from--.

In column 9, line 48, please change "fiat" to --flat--.

Signed and Sealed this

Thirteenth Day of December, 1994

Attest:

BRUCE LEHMAN

Attesting Officer

Commissioner of Patents and Trademarks